United States Patent [19]

Kawahara et al.

[11] Patent Number: 4,944,154
[45] Date of Patent: Jul. 31, 1990

[54] HYDRAULICALLY OPERATED CONTINUOUSLY VARIABLE TRANSMISSION

[75] Inventors: Eiichiro Kawahara; Kenichi Ikejiri; Mitsumasa Furumoto; Noboru Yamamoto, all of Saitama, Japan

[73] Assignee: Honda Giken Kogyo Kabushiki Kaisha, Tokyo, Japan

[21] Appl. No.: 130,418

[22] Filed: Dec. 9, 1987

[30] Foreign Application Priority Data

Dec. 9, 1986 [JP] Japan .................. 61-293069

[51] Int. Cl.⁵ ................. F01B 13/04; F16D 37/00
[52] U.S. Cl. ........................ 60/488; 60/487; 91/499; 184/6.17
[58] Field of Search .............. 184/6.17, 6.12; 60/487–492; 91/499, 505, 506

[56] References Cited

U.S. PATENT DOCUMENTS

| | | |
|---|---|---|
| 2,662,375 | 12/1953 | Postel . |
| 2,777,286 | 1/1957 | Badalini . |
| 3,108,544 | 10/1963 | Pesce . |
| 3,362,342 | 1/1968 | Flint . |
| 3,364,680 | 1/1969 | Osojnak . |
| 3,449,912 | 6/1969 | Dunikowski . |
| 3,464,206 | 9/1969 | Badalini . |
| 3,508,401 | 4/1970 | Aplin . |
| 3,834,164 | 9/1974 | Ritter . |
| 4,087,969 | 5/1978 | Takahashi et al. ........ 60/488 X |
| 4,444,093 | 4/1984 | Koga . |
| 4,478,134 | 10/1984 | Kawahara et al. ........ 91/488 |
| 4,548,036 | 10/1985 | Matsuda et al. ........ 60/468 X |
| 4,646,520 | 3/1987 | Furumoto . |

FOREIGN PATENT DOCUMENTS

| | | |
|---|---|---|
| 2264319 | 7/1974 | Fed. Rep. of Germany . |
| 41-3208 | 2/1966 | Japan . |
| 54-134252 | 10/1979 | Japan . |
| 54-134253 | 10/1979 | Japan . |
| 55-152622 | 11/1980 | Japan . |
| 56-52659 | 5/1981 | Japan . |
| 56-143857 | 11/1981 | Japan . |
| 57-70968 | 1/1982 | Japan . |
| 57-76357 | 5/1982 | Japan . |
| 59-38467 | 9/1984 | Japan . |

Primary Examiner—Edward K. Look
Attorney, Agent, or Firm—Lyon & Lyon

[57] ABSTRACT

A hydraulically operated continuously variable transmission includes a hydraulic motor coupled to an output shaft and having a motor swash plate and a motor cylinder supporting an annular array of slidable motor plungers held in slidable contact with the motor swash plate, a distribution member integral with the motor cylinder, a hydraulic pump coupled to an input shaft in sliding contact with the distribution member and having a pump swash plate movable with the motor cylinder and a pump cylinder supporting an annular array of slidable pump plungers held in slidable contact with the pump swash plate, a closed hydraulic circuit interconnecting the hydraulic pump and the hydraulic motor, the pump cylinder being coaxially surrounded by the motor cylinder with a hydraulically hermetic chamber defined therebetween, and a replenishing pump operatively coupled to the input shaft and connected to the closed hydraulic circuit through a replenishing oil passage. The replenishing oil passage partly extends in the distribution member, and the distribution member has an oil passage defined therein and interconnecting the replenishing oil passage and the hydraulically hermetic chamber. A relief valve is disposed in the oil passage in the distribution chamber, the relief valve being openable when the pressure of oil in the replenishing oil passage exceeds a prescribed level.

9 Claims, 8 Drawing Sheets

HYDRAULICALLY OPERATED CONTINUOUSLY VARIABLE TRANSMISSION

BACKGROUND OF THE INVENTION

The present invention relates to a hydraulically operated continuously variable transmission, and more particularly to a hydraulically operated continuously varible transmission having a relief valve disposed in a distribution member for releasing oil from a replenishing oil passage into an oil chamber.

Hydraulically operated continuously variable transmissions are known in the art as disclosed in Japanese Laid-Open Patent Publication No. 56-143857, for example.

In such hydraulically operated continuously variable transmissions, a hydraulic pump and a hydraulic motor are interconnected by a closed hydraulic circuit. Japanese Laid-Open Patent Publication No. 57-76357 also discloses a hydraulically operated transmission.

SUMMARY OF THE INVENTION

In view of the drawbacks of conventional hydraulically operated continuously variable transmissions, it is an object of the present invention to provide a hydraulically operated continuously variable transmission which is capable of introducing excess oil from a replenishing oil passage into a hydraulically hermetic chamber without greatly varying the conventional structure and size.

According to the present invention, there is provided a hydraulically operated continuously variable transmission comprising an output shaft, a hydraulic motor coupled to the output shaft and having a motor swash plate and a motor cylinder supporting an annular array of slidable motor plungers held in slidable contact with the motor swash plate, a distribution member integral with the motor cylinder, an input shaft, a hydraulic pump coupled to the input shaft in sliding contact with the distribution member and having a pump swash plate movable with the motor cylinder and a pump cylinder supporting an annular array of slidable pump plungers held in slidable contact with the pump swash plate, a closed hydraulic circuit interconnecting the hydraulic pump and the hydraulic motor, the pump cylinder being coaxially surrounded by the motor cylinder with a hydraulically hermetic chamber defined therebetween, a replenishing pump operatively coupled to the input shaft and connected to the closed hydraulic circuit through a replenishing oil passage, the replenishing oil passage partly extending in the distribution member, the distribution member having an oil passage defined therein and interconnecting the replenishing oil passage and the hydraulically hermetic chamber, and a relief valve disposed in the oil passage in the distribution member, the relief valve being openable when the pressure of oil in the replenishing oil passage exceeds a prescribed level.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
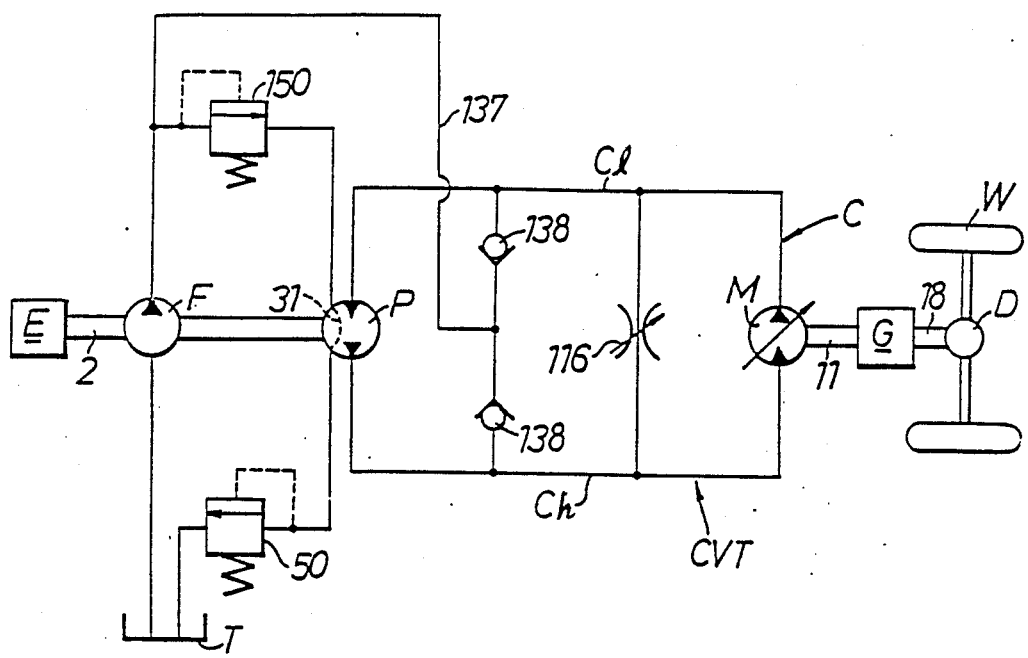
FIG. 1 is a circuit diagram of a hydraulic circuit arrangement of a hydraulically operated continuously variable transmission according to an embodiment of the present invention.

Like or corresponding parts are denoted by like or corresponding reference numerals throughout the several views.

FIG. 1 shows a hydraulically operated continuously variable transmission CVT according to an embodiment of the present invention for use on a motor vehicle such as an automobile, the transmission CVT basically comprising a hydraulic pump P of the fixed displacement type coupled to an input shaft 2 driven by an engine E and a hydraulic motor M of the variable displacement type disposed coaxially with the hydraulic pump P. The hydraulic pump P and the hydraulic motor M are coupled in a closed hydraulic circuit C. The hydraulic motor M is operatively coupled to wheels W through an output shaft 11 a forward/reverse gear assembly G, an auxiliary shaft 18, and a differential D.

The closed hydraulic circuit C includes a higher pressure oil passage Ch interconnecting the outlet port of the hydraulic pump P and the inlet port of the hydraulic motor M and a lower pressure oil passage Cl interconnecting the outlet port of the hydraulic motor M and the inlet port of the hydraulic pump P. The higher and lower pressure oil passages Ch, Cl are interconnected by a clutch valve 116. The input shaft 2 drives a replenishing pump F having an outlet port connected to the higher and lower oil passages Ch, Cl through a replenishing oil passage 137 and a pair of check valves 138. The replenishing pump F, when actuated, supplies working oil from an oil tank T through the replenishing oil passage 137 to the closed hydraulic circuit C to compensate for an oil shortage in the circuit C. A relief valve 150 is connected to the replenishing oil passage 137. When the oil pressure in the replenishing oil passage 137 exceeds a prescribed pressure level, the relief valve 150 is opened to release oil which is introduced into a hydraulically hermetic chamber 31 of the hydraulic pump P. A pressure control valve 50 coupled between the chamber 31 and the oil tank T is opened when the oil pressure in the chamber 31 exceeds a prescribed pressure level. The pressure level set for opening the pressure control valve 50 is lower than the pressure level set for the relief valve 150.

The clutch valve 116 comprises a restriction valve switchable between an open position in which the higher and lower pressure oil passages Ch, Cl are interconnected and a fully closed position in which the higher and lower pressure oil passages Ch, Cl are disconnected from each other, the clutch valve 116 having an intermediate open position. When the clutch valve 116 interconnects the higher and lower pressure oil passages Ch, Cl, no oil pressure is supplied to the hydraulic motor M and hence the transmission is in a neutral condition with the hydraulic motor M being inoperative. When the clutch valve 116 disconnects the higher and lower pressure oil passages Ch, Cl from each other, working oil circulates between the hydraulic pump P and the hydraulic motor M to transmit driving power for thereby causing the motor vehicle to run. When the clutch valve 116 is in the intermediate open position, working oil circulates at a rate dependent on the opening of the clutch valve 116, which is thus held in a "partly engaged" condition.

The structure of the continuously variable transmission CVT will be described in detail with reference to FIG. 2. The continuously variable transmission CVT is housed in a transmission case 1 composed of a pair of longitudinally separate case members 1a, 1b.

The hydraulic pump P has a pump cylinder 4 splined at 3 to an input shaft 2, a plurality of cylinder holes or bores 5 defined in the pump cylinder 4 in a circular pattern around the input shaft 2, and a plurality of pump plungers 6 slidably fitted respectively in the cylinder holes 5. The power of the engine is transmitted through a flywheel 7 to the input shaft 2.

The hydraulic motor M has a motor cylinder 8 disposed concentrically in surrounding relation to the pump cylinder 4 and rotatable relatively thereto, a plurality of cylinder holes or bores 9 defined in the motor cylinder 8 in a circular pattern around the center of rotation thereof, and a plurality of motor plungers 10 slidably fitted respectively in the cylinder holes 9.

The motor cylinder 8 has axially opposite ends on which output and support shafts 11, 12 are coaxially mounted, respectively. The output shaft 11 is rotatably supported on the axial end wall of the case member 1a by means of a needle bearing 13, and the support shaft 12 is rotatably supported on the axial end wall of the case member 1b by means of a ball bearing 14.

The input shaft 2 extends through the end wall of the case member 1a in a fluid-tight manner, and is disposed concentrically in the output shaft 11. A plurality of needle bearings 15 are disposed between the inner surface of the output shaft 11 and the outer surfce of the input shaft 2, so that the input shaft 2 and the pump cylinder 4, and the output shaft 11 and the motor cylinder 8 are relatively rotatable.

Parallel to the output shaft 11, the auxiliary shaft 18 is rotatably supported on the opposite end walls of the transmission case 1 by a roller bearing 16 and a ball bearing 17. The forward/reverse gear assembly G is located between the auxiliary shaft 18 and the output shaft 11.

The forward/reverse gear assembly G comprises a pair of driver gears 19, 20 fixedly mounted on the output shaft 11, a driven gear 21 rotatably supported on the auxiliary shaft 18 in mesh with the driver gear 19, a driven gear 22 rotatably supported on the auxiliary shaft 18 in radial alignment with the other driver gear 20, an intermediate gear 23 meshing with the driver gear 20 and the driven gear 22, a driven clutch gear 24 fixed to the auxiliary shaft 18 between driver clutch gears 21a, 22a integral with the opposite surfaces of the driven gears 21, 22, and a clutch member 25 for selectively coupling the driver clutch gears 21a, 22a to the driven clutch gear 24. A shift fork 26 engages in the clutch member 25 for selectively moving the same axially into engagement with the driver clutch gear 21a and the driven clutch gear 24 or the driver clutch gear 22a and the driven clutch gear 24.

The auxiliary shaft 18 has an integral gear 28 held in mesh with an input gear 27 of the differential D. In response to operation of the clutch member 25, the differential D is operated selectively in forward and reverse directions of the motor vehicle.

Figure 2:
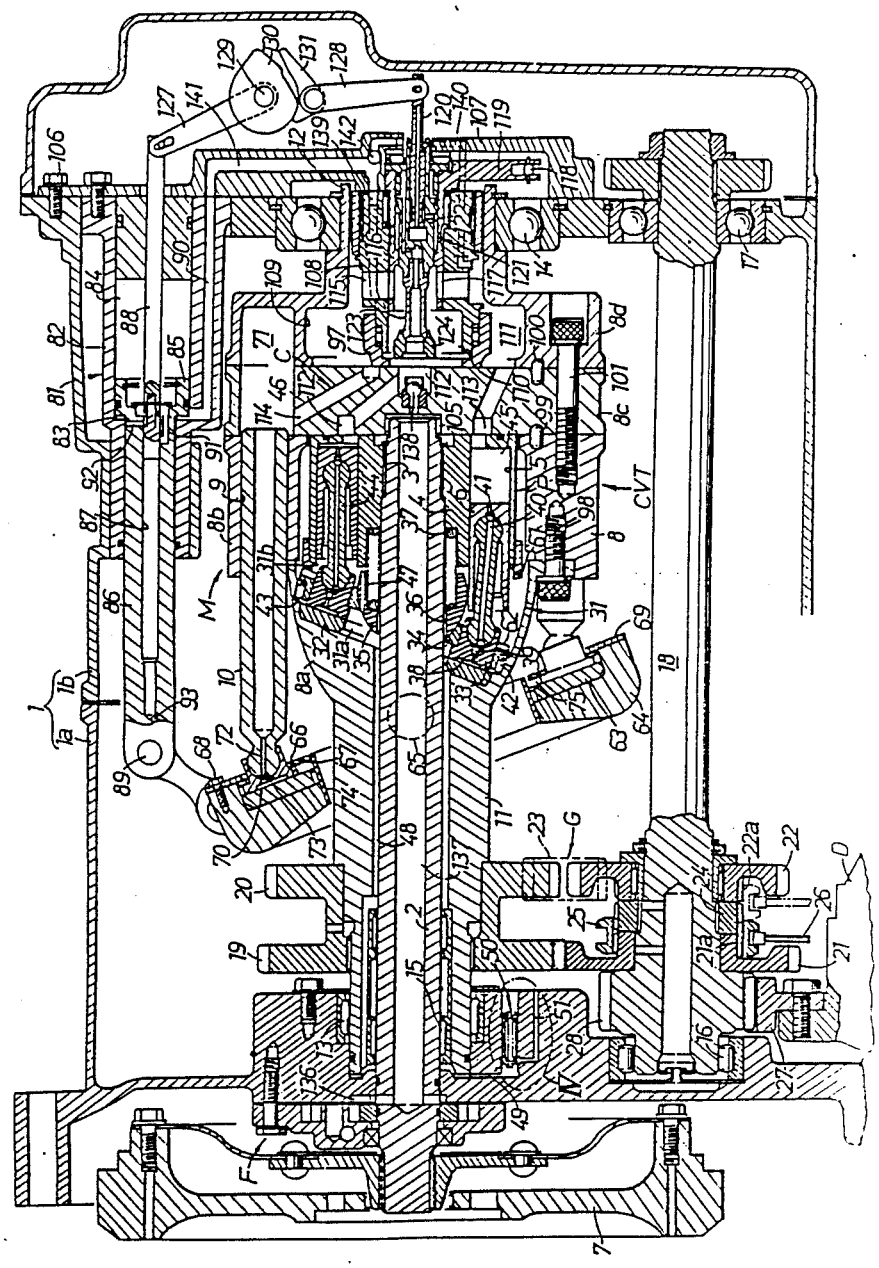
FIG. 2 is a longitudinal cross-sectional view of the hydraulically operated continuously variable transmission.
Figure 3:
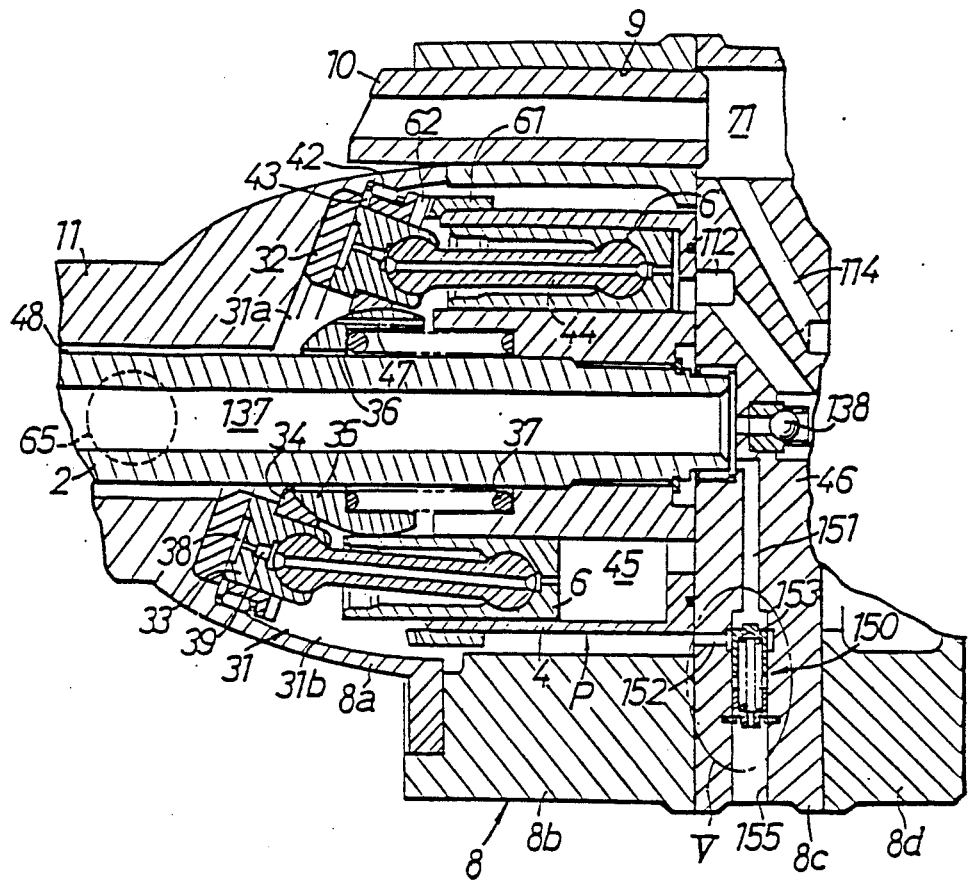
FIG. 3 is an enlarged fragmentary cross-sectional view of the hydraulically operated continuously variable transmission shown in FIG. 2.

As shown in FIG. 2, the hydraulically hermetic chamber 31 is defined betwen the motor cylinder 8 and the pump cylinder 4, and a pump swash plate 32 is supported in the chamber 31 inwardly of the motor cylinder 8 in facing relation to the end face of the pump cylinder 4. An annular unitary pump shoe 33 is held in slidable contact with the pump swash plate 32.

The pump plungers 6 and the pump shoe 33 are relatively swingably coupled by connecting rods 44. A presser ring 34 supported on the motor cylinder 8 by a roller bearing 42 is held against an inner peripheral step of the pump shoe 33. A spring holder 35 is held against the presser ring 34, the spring holder 35 being coupled to the input shaft 2 through splines 36 which allow axial movement of the spring holder 35 on the input shaft 2 but prevent rotation of the spring holder 35 relatively to the input shaft 2. A coil spring 37 is disposed around the input shaft 2 between the spring holder 35 and the pump cylinder 4 for normally pressing the spring holder 35 to cause the presser ring 34 to push the pump shoe 33 resiliently toward the pump swash plate 32. The spring holder 35 has a partly spherical surface contacting a complementary partly spherical surface of the presser ring 34. Therefore, the spring holder 35 is neatly held against the presser ring 34 for transmitting the resilient force from the spring 37 to the presser ring 34.

The chamber 31 is divided into a first chamber 31a near the pump swash plate 32 and a second chamber 31b near the pump cylinder 4 by the pump shoe 33, the presser ring 34, and the spring holder 35.

The pump swash plate 32 and the pump shoe 33 have mutually sliding surfaces with their inner peripheral edges facing into the first chamber 31a, so that lubricating oil leaking from between these sliding surfaces flow into the first chamber 31a. To lubricate the sliding surfaces of the pump swash plate 32 and the pump shoe 33, an annular hydraulic pocket 38 is defined in the front surface of the pump shoe 33 and communicates through oil holes 39, 30, 41 defined in the pump shoe 33, the connecting rods 44, and the pump plungers 6 with pump chambers 45 defined between the pump plungers 6 and the pump cylinder 4. Therefore, oil under pressure in the pump chambers 45 is supplied through the oil holes 41, 40, 39 to the hydraulic pocket 38 for thereby lubricating the sliding surfaces of the pump shoe 33 and the pump swash plate 32. At the same time, oil pressure in the hydraulic pocket 38 is applied to the pump shoe 33 to bear the projecting thrust of the pump plungers 6, so that the pressure of contact between the pump shoe 33 and the pump swash plate 32 can be reduced.

An annular lubricating chamber 43 is defined around the sliding surfaces of the pump swash plate 32 and the pump shoe 33 by means of the motor cylinder 8, the pump swash plate 32, the pump shoe 33, and a roller bearing 42, the lubricating chamber 43 being part of the second chamber 31b.

Oil under pressure in the hydraulic pocket 38 leaks along the sliding surfaces of the pump shoe 33 and the pump swash plate 32 into the lubricating chamber 43 at all times. The oil that has thus leaked first fills the lubricating chamber 43 as lubricating oil, and then leaks into the second chamber 31b through the roller bearing 42. Therefore, the lubricating chamber 43 is always replenished with new lubricating oil which can reliably lubricate the sliding surfaces of the pump shoe 33 and the pump swash plate 32 even from outside of the pump shoe 33.

Into the second chamber 31b, there oil flows the lubricating chamber 43 and also lubricating oil from the sliding surfaces of the pump plungers 6 and the cylinder holes 5 and the sliding surfaces of the pump cylinder 4 and a distribution member 46.

The spring holder 35 has a passage 47 by which the first and second chamber 31a, 31b are held in communication with each other. Between the output shaft 11 and the input shaft 2, there is defined a first discharge passage 48 communicating with the first chamber 31a and coupled through a second discharge passage 49, the pressure control valve 50, a and a third discharge passage 51 to the oil tank on the bottom of the transmission case 1.

Figure 4:
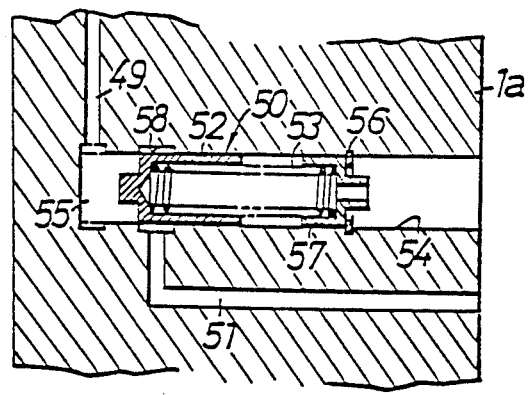
FIG. 4 is an enlarged fragmentary cross-sectional view of an encircled area indicated by IV in FIG. 2.

As shown in FIG. 4, the pressure control valve 50 comprises a bottomed cylindrical spool valve body 52 for allowing and cutting off fluid communication between the second and third discharge passages 49, 51, and a spring 53 for normally urging the spool valve body 52 in a direction to cut off such fluid communication. The end wall of the case member 1a of the transmission case 1 has a bottomed hole 54 parallel to the input shaft 2. The spool valve body 52 is slidably fitted in the bottomed hole 54, defining an oil chamber 55 between the bottom of the hole 54 and the spool valve body 52. A support member 57 is also inserted in the bottomed hole 54, the support member 57 being prevented from moving toward the open end of the bottomed hole 54 by means of a retaining ring 56 fitted in the bottomed hole 54. The spring 53 is disposed between the support member 57 and the spool valve body 52. The spool valve body 52 is therefore caused to slide in the bottom hole 54 until the hydraulic pressure in the oil chamber 55 which tends to open the pressure control valve 50 and the spring force of the spring 53 which tends to close the pressure control valve 50 are counterbalanced.

The oil chamber 55 is held in communication with the second discharge passage 49 which is defined in the end wall of the case member 1a. An annular groove 58 is defined in a n inner peripheral surface of the bottomed hole 54 and held in communication with the third discharge passage 51. The annular groove 58 is selectively brought into and out of communication with the oil chamber 55 by the spool valve body 52.

Therefore, when the oil pressure in the oil chamber 55, i.e, the chamber 31, exceeds a level set by the spring 53, the pressure control valve 50 is opened to adjust the oil pressure in the chamber 31 to a prescribed level.

Intermeshing bevel gears 61, 62 are fixed respectively to the confronting ends of the pump cylinder 4 and the pump shoe 33. The bevel gears 61, 62 are synchronous gears having the same number of teeth. When the pump cylinder 4 is rotated by the input shaft 2, the pump shoe 33 is synchronously rotated through the bevel gears 61, 62. On rotation of the pump shoe 33, those pump plungers 6 which run along an ascending side of the inclined surface of the pump swash plate 32 are moved in a discharge stroke by the pump swash plate 32, the pump shoe 33, and the connecting rods 44, and those pump plungers 6 which travel along a descending side of the inclined surface of the pump swash plate 32 are moved in a suction stroke.

In the hydraulic motor M, an annular motor swash plate 63 confronting the motor cylinder 8 is fitted in an annular swash plate holder 64. The swash plate holder 64 has a pair of integral trunnions 65 projecting outwardly from its opposite sides and pivotally supported in the transmission case 1. Therefore, the motor swash plate 63 can be tilted together with the swash plate holder 64 about the axis of the trunnions 65.

The tip ends of the respective motor plungers 10 are relatively swingably coupled to a plurality of motor shoes 66 held in slidable contact with the motor swash plate 63. To keep the respective motor shoes 66 in slidable contact with the motor swash plate 63, a presser plate 67 which holds the backs of the motor shoes 66 is rotatably supported by a ring 69 fastened to the swash plate holder 64 by means of bolts 68. The motor shoes 66 and the motor plungers 10 where they are coupled project through the presser plate 67 at a plurality of circumferentially spaced positions. The presser plate 67 is therefore rotatable with the motor shoes 66.

Each of the motor shoes 66 has a hydraulic pocket 70 defined in its front face slidably contacting the motor swash plate 63. Oil chambers 71 defined between the closed ends of the cylinder holes 9 and the respective motor plungers 10 communicate with the corresponding hydraulic pockets 70 through joined oil holes 72, 73 defined in the motor plungers 10 and the motor shoes 66. Therefore, oil under pressure in the oil chambers 71 is supplied through the oil holes 72, 73 into the hydraulic pockets 70 to apply a pressure to the motor shoes 66 for bearing the projecting thurst of the motor plungers 10. The pressure thus applied to the motor shoes 66 reduces the pressure of contact between the motor shoes 66 and the motor swash plate 63, and causes oil to lubricate the sliding surfaces of the motor shoes 66 and the motor swash plate 63.

A cylindrical partition 74 is fitted against the inner peripheral surface of the swash plate holder 64 in confronting relation to the inner peripheral surface of the presser plate 67 with a small gap therebetween. The partition 74, the swash plate holder 64, and the presser plate 67 jointly define a lubricating chamber 75 accommodating the sliding surfaces of the motor shoes 66 and the motor swash plate 63.

Oil under pressure in the respective hydraulic pockets 70 leaks along the sliding surfaces of the motor shoes 66 and the motor swash plate 63 at all times. The oil that has thus leaked first fills the lubricating chamber 75 as lubricating oil, and then leaks out through the gap around the presser plate 67. Therefore, the lubricating chamber 75 is always replenished with new lubricating oil which can reliably lubricate the sliding surfaces of the motor shoes 66 and the motor swash plate 63 even from outside of the motor shoes 66.

If the pressure in the lubricating chamber 75 approaches the pressure in the hydraulic pockets 70, the ability of the hydraulic pockets 70 to hydraulically support the motor shoes 66 would be impaired. To prevent this, the gap around the presser plate 67 is suitably selected dependent on the amount of oil leakage from the hydraulic pockets 70 so that the lubricating chamber 75 will hold oil under an approximately atmospheric pressure condition.

A servomotor 81 for tilting the swash plate holder 64, i.e., the motor swash plate 63 is disposed in the transmission case 1. The servomotor 81 comprises a servo cylinder 82 fixed to the transmission case 1, a servo piston 85 slidably disposed in the servo cylinder 82 and dividing the interior space of the servo cylinder 82 into a lefthand oil chamber 83 and a righthand oil chamber 84, a piston rod 86 integral with the servo piston 85 and movably extending through the end wall of the servo cylinder 82 near the lefthand oil chamber 83 in a fluid-tight manner, and a pilot valve 88 having an end slidably fitted in a valve hole 87 defined in the servo piston 85 and the piston rod 86 and movably extending through the end of the servo cylinder 82 near the righthand oil chamber 84 in a fluid-tight manner.

The piston rod 86 is coupled to the swash plate holder 64 by a pin 89. An oil passage 90 defined in the servo cylinder 82 is held in communication with the lefthand oil chamber 83 for supplying oil pressure to act on the servo piston 85. The servo piston 85 and the piston rod 86 have a passage 91 for bringing the righthand oil chamber 84 into communication with the valve hole 87 in response to rightward movement of the pilot valve 88, and a passage 92 for bringing the righthand oil chamber 84 into communication with the lefthand oil chamber 83 in response to leftward movement of the pilot valve 88. The valve hole 87 communicates with the oil tank at the bottom of the transmission case 1 through a return passage 93.

The servo piston 85 is operated in amplified movement by following the lefthand and righthand movement of the pilot valve 88 under the oil pressure from the oil passage 90. In response to movement of the servo piston 85, the swash plate holder 64, i.e., the motor swash plate 63 can be angularly shifted or adjusted between the most inclined position (as shown) and the right-angle position where the motor swash plate 63 lies perpendicularly to the motor plungers 10. Upon rotation of the motor cylinder 8, the motor swash plate 63 reciprocally moves the motor plungers 10 into and out of the cylinder holes 9. The stroke of the motor plungers 10 can continuously be adjusted by the inclination of the motor swash plate 63.

The closed hydraulic circuit C is formed between the hydraulic pump P and the hydraulic motor M through the distribution member 46 and a distribution ring 97. When the pump cylinder 4 is rotated by the input shaft 2, high-pressure working oil discharged from the pump chambers 45 accommodating therein the pump plungers 6 in the discharge stroke flows into the oil chambers 71 of the cylinder holes 9 accommodating therein the motor plungers 10 which are in the expansion stroke. Working oil discharged from the oil chambers 71 accommodating therein the motor plungers 10 in the compression stroke flows back into the pump chambers 45 accommodating therein the pump plungers 6 in the suction stroke. During this time, the motor cylinder 8, i.e., the output shaft 11 is rotated by the sum of the reactive torque applied by the motor plungers 10 in the discharge stroke to the motor cylinder 8 through the motor swash plate 63 and the reactive torque received by the motor plungers 10 in the expansion stroke from the motor swash plate 63.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} = 1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M that is determined by the stroke of the motor plungers 10, from zero to a certain value.

The motor cylinder 8 comprises axially separate first through fourth members or segments 8a through 8d. The first member 8a includes the output shaft 11 as a unitary element, and accommodates the pump swash plate 32 therein. The cylinder holes 9 are defined in the second, third, and fourth members 8b through 8d. The third member 8c serves as the distribution member 46. The fourth member 8d has the support shaft 12 as a unitary element.

The first and second members 8a, 8b are coupled to each other by means of a plurality of bolts 98. The second, third, and fourth members 8b, 8c, 8d are relatively positioned by knock pins 99, 100 fitted in positioning holes defined in their mating end faces, and are firmly coupled together by means of a plurality of bolts 101.

The input shaft 2 has an inner end portion rotatably supported centrally in the distribution member 46 by a needle bearing 105. The pump cylinder 4 is resiliently held against the distribution member 46 by the spring 37.

A support plate 107 is fixed to an outer end surface of the case member 1b by means of bolts 106. To the support plate 107, there is securely coupled a cylindrical fixed shaft 108 projecting into the support shaft 12 of the motor cylinder 8. The distribution ring 97 slidably held against the distribution member 46 is eccentrically supported on the inner end of the fixed shaft 108. The distribution ring 97 divides an interior space 109 in the fourth member 8d of the motor cylinder 8 into an inner chamber 110 and an outer chamber 111. The distribution member 46 has an outlet port 112 and an inlet port 113. The outlet port 112 provides fluid communication between the pump chambers 45 that receive the pump plungers 6 operating in the discharge stroke and the inner chamber 110. The inlet port 13 provides fluid communication between the pump chambers 45 that receive the pump plungers 6 operating in the suction stroke and the outer chamber 111. The distribution member 46 also has a number of communication ports 114 defined therein and through which the oil chambers 71 of the motor cylinder 8 communicate with the inner chamber 110 or the outer chamber 111.

Therefore, upon rotation of the pump cylinder 4, high-pressure working oil discharged by the pump plungers 6 in the discharge stroke flows from the outlet port 112 via the inner chamber 110, and those communication ports 114 which communicate with the inner chamber 110 into the oil chambers 71 receiving the motor plungers 10 which are in the expansion stroke, thereby imposing a thrust on these motor plungers 10. Working oil discharged by the motor plungers 10 operating in the compression stroke flows through those communication ports 14 which communicate with the outer chamber 111 and the inlet port 113 into the pump chambers 45 receiving the pump plungers 6 in the suction stroke. Upon such circulation of the working oil, hydraulic power can be transmitted from the hydraulic pump P to the hydraulic motor M as described above.

The fixed shaft 108 has a peripheral wall having two, for example, radial bypass ports 115 through which the inner and outer chambers 110, 111 communicate with each other. The clutch valve 116 in the form of a cylindrical clutch valve is rotatably fitted in the fixed shaft 108 for selectively opening and closing the ports 115. The clutch valve 116 has valve holes 117 defined in its peripheral wall near the distal end thereof, and a control connector 119 on the opposite end to which a control shaft 118 coupled to a clutch control device (not shown) is connected. The clutch valve 116 serves as a clutch for selectively connecting and disconnecting the hydraulic pump P and the hydraulic motor M.

When the clutch valve 116 is rotated about its own axis to fully open the valve holes 117 in full registry with the bypass ports 115, the clutch is in an "OFF" position. When the bypass ports 115 are fully closed by shifting the valve holes 117 out of registry therewith, the clutch is in an "ON" position. When the bypass ports 115 are partly opened by slightly shifting the valve holes 117, the clutch is in a "partly ON" (partly engaged) position. With the clutch OFF as shown, working oil discharged from the outlet port 112 into the inner chamber 110 flows through the bypass ports 115 and the outer chamber 111 directly into the inlet port 113, making the hydraulic motor M inoperative. When the clutch is ON, the above oil flow is shut off, and workin oil is circulated from the hydraulic pump P to the hydraulic motor M, allowing hydraulic power to be transmitted from the hydraulic pump P to the hydraulic motor M.

The clutch valve 116 houses therein a hydraulic servomotor 121 actuatable by a pilot valve 20. The servomotor 121 has a servo piston 122 including a valve rod 123 which is of a diameter smaller than the inside diameter of the clutch valve 116. The valve rod 123 projects into the inner chamber 110 and has a distal end on which a closure valve 124 is pivotally mounted for closing the outlet port 112. When the servo piston 122 is moved to the left until the closure valve 124 is held closely against the distribution member 46, the outlet port 112 is closed. The outlet port 112 is closed when the motor swash plate 73 is vertically positioned (as viewed in FIG. 2) for the transmission ratio of 1. With the outlet port 112 closed, the pump plungers 6 are hydraulically locked to cause the pump cylinder 4 to mechanically drive the motor cylinder 8 through the pump plungers 6 and the pump swash plate 32. As a result, the thrust of the motor plungers 10 on the motor swash plate 63 is eliminated, and so is the load on the various bearings.

The fixed shaft 108 and the support plate 107 have an oil passage 139 communicating with the inner chamber 110 and an oil passage 140 communicting with the outer chamber 111. The support plate 107 has an oil passage 141 communicating with the oil passage 90 connected to the servomotor 81. A changeover valve 142 is disposed in the support plate 107 for selectively communicating the oil passages 139, 140 with the oil passage 141. The changeover valve 142 operates to communicate one of the oil passages 139, 140 which is of a higher oil pressure, with the oil passage 141. Therefore, the servomotor 81 for tilting the motor swash plate 63 of the hydraulic motor M is supplied with the higher oil pressure from the inner chamber 110 or the outer chamber 111.

The pilot valves 88, 120 of the respective servomotors 81, 121 are coupled to ends of links 127, 128, respectively. The other end of the link 127 is coupled to a rotatable shaft 129 which can be rotated about its own axis by an actuator (not shown), the shaft 129 having a cam 130 supported thereon. The other end of the link 128 supports thereon a cam follower 131 slidingly contacting the cam 130. When the servomotor 81 is operated to vertically position the motor swash plate 63, the servomotor 121 is operated by the link 127, the cam 130, the cam follower 131, and the link 128 to enable the closure valve 124 to close the outlet port 112.

The replenishing pump F is mounted on an outer surface of the end wall of the case member 1a. The replenishing pump F is driven by the input shaft 2 for feeding working oil from the oil tank on the bottom of the transmission case 1. The replenishing pump F has an outlet port 136 communicating through an axial central replenishing oil passage 137 defined in the input shaft 2 with the inner chamber 110 via the check valve 138 and also with the outer chamber 111 via the other check valve (not shown). The replenishing pump F therefore supplies oil to automatically compensate for any oil leakage from the closed hydraulic circuit C composed of the hydraulic pump P and the hydraulic motor M.

Figure 5:
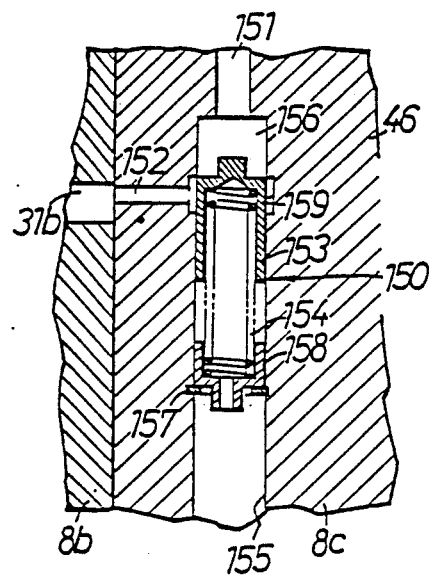
FIG. 5 is an enlarged fragmentary cross-sectional view of an encircled area indicated by V in FIG. 3.

As shown in FIG. 5, the distribution member 46 has an oil passage 151 communicating with the replenishing oil passage 137 and an oil passage 152 communicating with the second chamber 31b of the chamber 31, with the relief valve 150 being disposed in the distribution member 46 between the oil passages 151, 152.

The relief valve 150 comprises a bottomed cylindrical spool valve body 153 for allowing and cutting off fluid communication between the oil passages 151, 152, and a spring 154 for normally urging the spool valve body 153 in a direction to cut off such fluid communication. The distribution member 46 has a bottomed hole 155 defined therein and opening at an outer side surface thereof. The spool valve body 153 is slidably fitted in the bottomed hole 155, defining an oil chamber 156 between the bottom of the hole 155 and the spool valve body 153. A support member 158 is also inserted in the bottomed hole 155, the support member 158 being prevented from moving toward the open end of the bottomed hole 155 by means of a retaining ring 157 fitted in the bottomed hole 155. The spring 154 is disposed between the support member 158 and the spool valve body 153. The spool valve body 153 is therefore caused to slide in the bottom hole 155 until the hydraulic pressure in the oil chamber 156 which tends to open the relief valve 150 and the spring force of the spring 154 which tends to close the relief valve 150 are counterbalanced.

The oil chamber 156 is held in communication with the oil passage 151. An annular groove 159 is defined in an inner peripheral surface of the bottomed hole 155 and held in communication with the oil passage 152. The annular groove 59 is selectively brought into and out of communication with the oil chamber 156 by the spool valve body 153.

Therefore, when the oil pressure in the oil chamber 156, i.e., the replenishing oil passage 137, exceeds a level set by the spring 154, the relief valve 150 is opened to inttroduce oil released from the replenishing oil passage 137 into the chamber 31 via the oil passage 152. The pressure level set for opening the pressure control valve 50 is lower than the pressure level set for opening the relief valve 150.

Operation of the hydraulically operated continuously variable transmission thus constructed is as follows:

The second chamber 31b of the chamber 31 defined between the pump cylinder 4 and the motor cylinder 8 is supplied with most of the oil that has leaked from between the sliding surfaces of the shoe 33 and the swash plate 32, oil that has leaked from between the sliding surfaces of the pump cylinder 4 and the distribution member 46, and oil that has leaked from between the sliding surfaces of the plungers 6 and the cylinder holes 5. When the relief valve 150 is opened, working oil that has been released from the replenishing oil passage 137 is also introduced into the second chamber 31b. The first chamber 31a communicating with the second chambeer 31b through the passage 47 is supplied with the remainder of the oil that has leaked from between the sliding surfaces of the shoe 33 and the swash plate 32. The leaked oil sealed in the chamber 31 is discharged via the discharge passages 48, 49, 51 when the pressure control valve 50 is opened.

Excess oil from the replenishing oil passage 137 communicating with the replenishing pump F is supplied to the chamber 31 through the relief valve 150 in the above manner. Since the oil passage 151, 152 are defined in the distribution member 46, with the relief valve 150 disposed therebetween, excess oil from the replenishing pump F can be introduced into the chamber 31 without varying the conventional structure and size.

Figure 6:
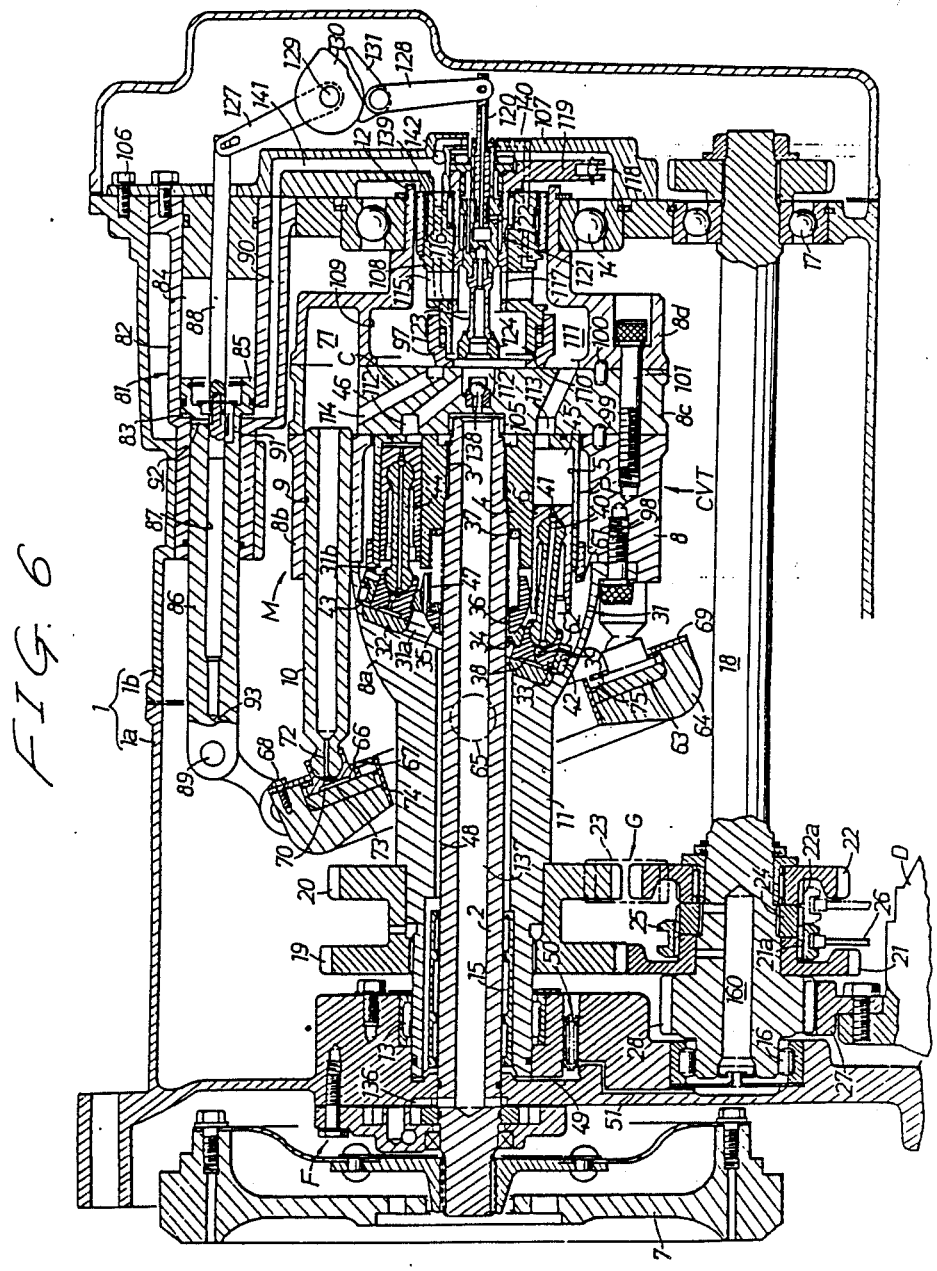
FIG. 6 is a longitudinal cross-sectional view of an automotive hydraulically operated continuously variable transmission according to another embodiment of the present invention.

FIG. 6 shows a hydraulically operated continuously variable transmission according to another embodiment of the present invention. This embodiment differs from the preceding embodiment only in that the third discharge passage 51 connected to the pressure control valve 50 is defined in the case member 1a of the transmission case 1 such that the third discharge passage 51 communicates with an oil reservoir 160 defines in an end of the auxiliary shaft 18. The roller bearing 16 and the gear assembly G can therefore be effectively lubricated with oil from the oil reservoir 160.

Figure 7:
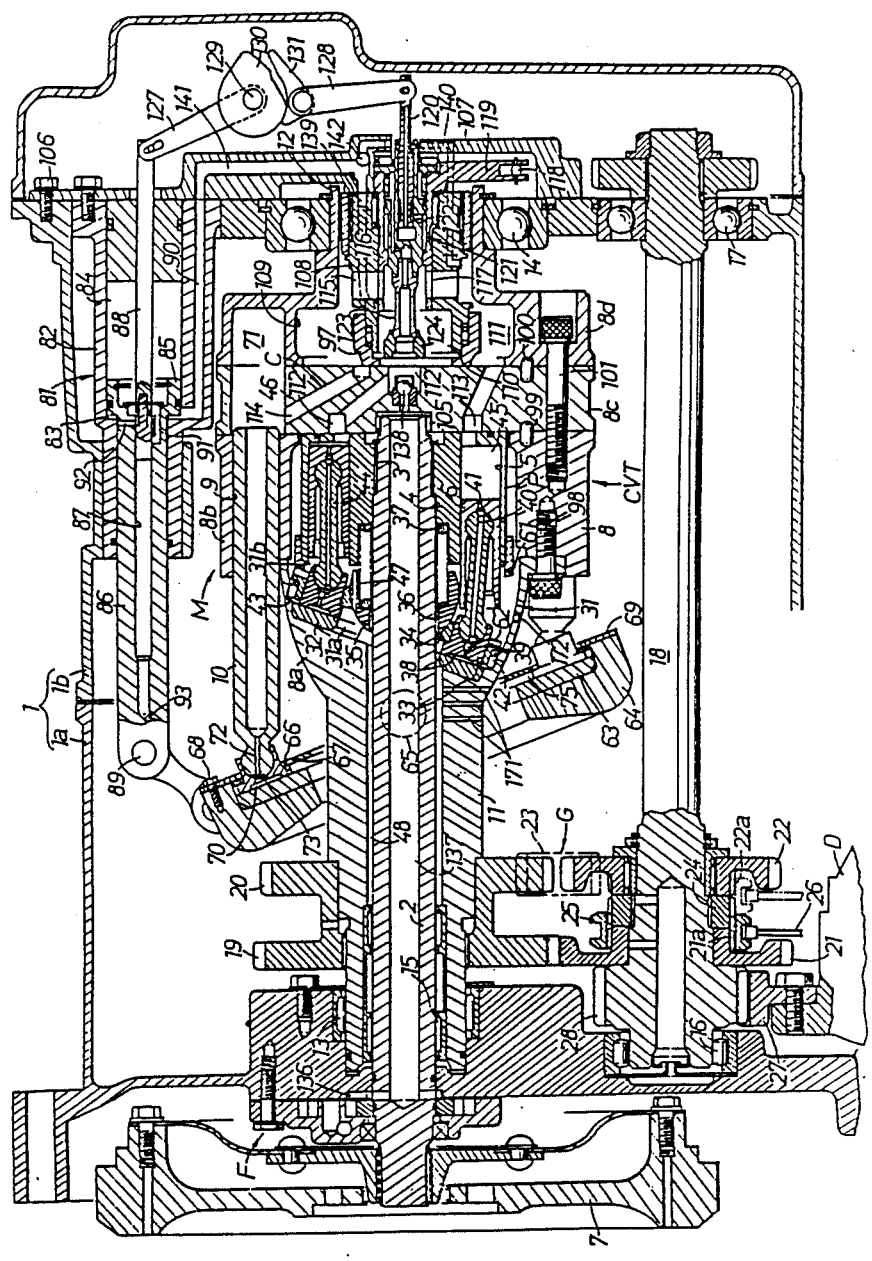
FIG. 7 is a longitudinal cross-sectional view of a hydraulic circuit arrangement of a hydraulically operated continuously variable transmission according to still another embodiment of the present invention.

According to still another embodiment shown in FIG. 7, the pressure control valve 50 is dispensed with, and a plurality of discharge holes 171 are defined in the motor cylinder 8 near the motor swash plate 63, the discharge holes 171 communicating with the chamber 31. The motor cylinder 8 also has a discharge hole 172 defined therein closely to the motor plungers 10 and communicating with the chamber 31. Lubricating oil from the chamber 31 can be poured via the discharge holes 171 over the sliding surfaces of the motor swash plate 63 and the motor shoe 66 to lubricate them, and also via the discharge hole 172 over the sliding surfaces of the motor plungers 10 and the cylinder holes 9 to lubricate them. The discharge holes 171, 172 should be of such a diameter as to retain a sufficient amount of lubricating oil in the chamber 31.

Figure 8:
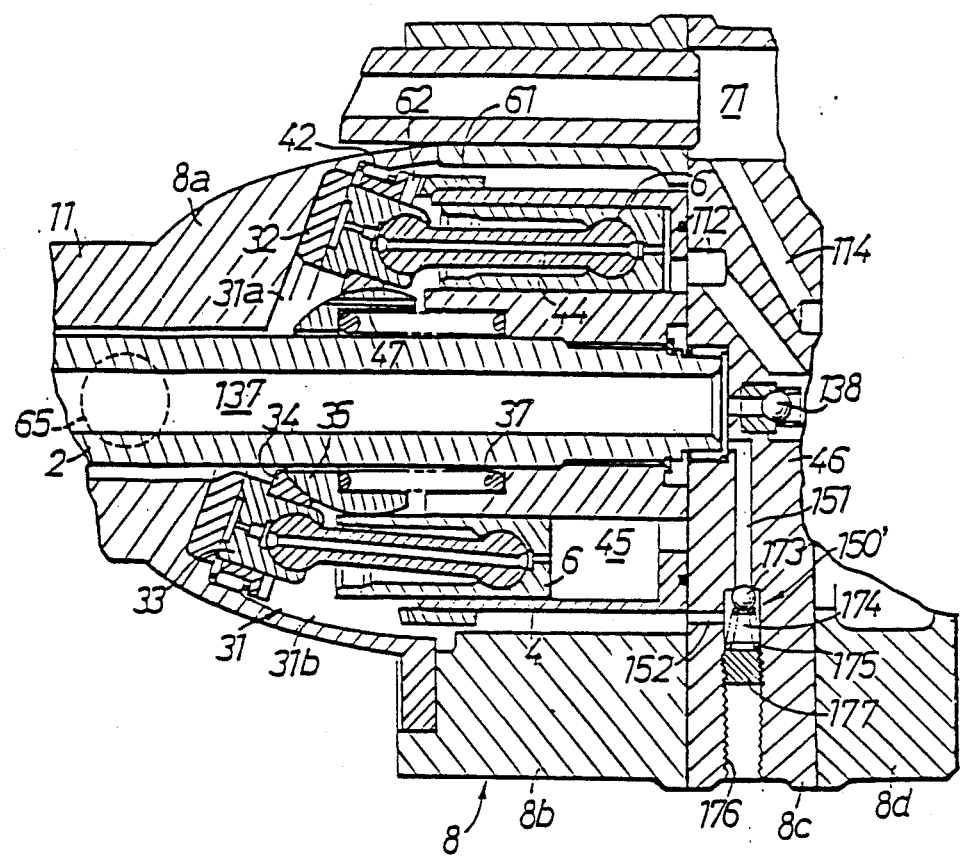
FIG. 8 is an enlarged fragmentary longitudinal cross-sectional view of a hydraulically operated continuously variable transmission according to a further embodiment of the present invention.

FIG. 8 illustrates a hydraulically operated continuously variable transmission according to a further embodiment of the present invention. In this embodiment, a relief valve 150' is disposed between the oil passages 151, 152 in the distribution member 46. The relief valve 150' comprises a spherical valve body 173 disposed in a valve chamber 174 defined in the distribution member 46 and normally urged in a closing direction by means of a spring 175. The valve chamber 174 comprises a bottomed hole 176 defined in the distribution member 46 and closed by a support member 177 threaded in the bottomed hole 176. The spring 175 is disposed between the valve body 173 and the support member 177.

Figure 9:
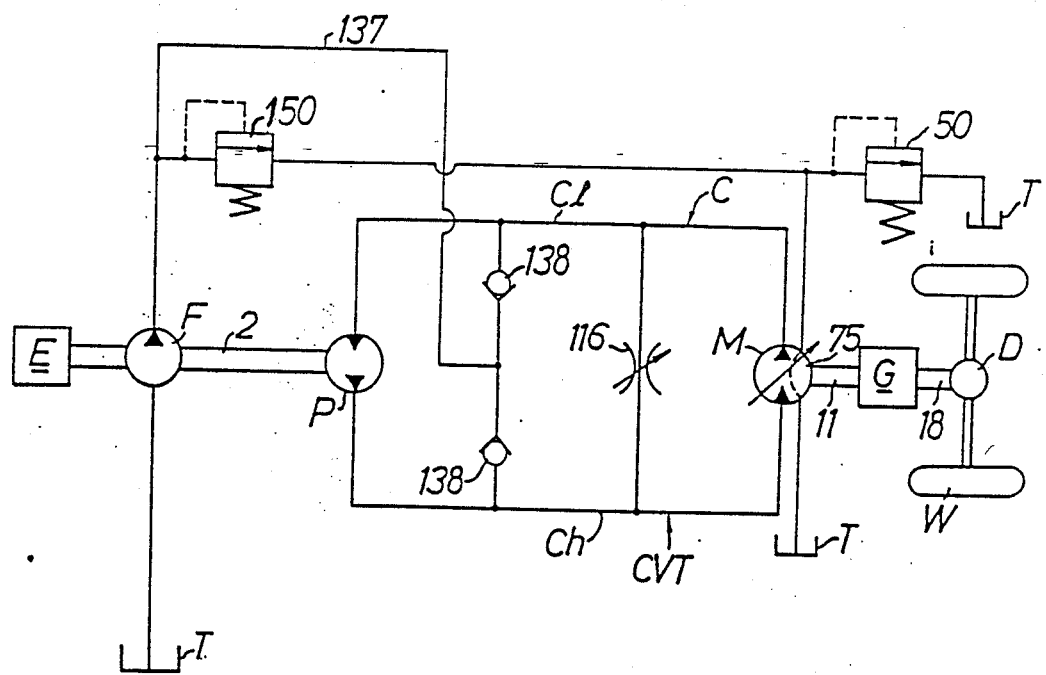
FIG. 9 is a circuit diagram of a hydraulic circuit arrangement of a hydraulically operated continuously variable transmission according to a still further embodiment of the present invention.

FIG. 9 schematically shows a hydraulically operated continuously variable transmission according to a still further embodiment of the present invention. As shown in FIG. 9, the relief valve 150 is connected between the replenishing oil passage 137 and the lubricating chamber 75 of the hydraulic motor M for supplying oil released from the relief valve 150 to the lubricating chamber 75. The pressure control valve 50 is connected between the oil tank T and a junction between the relief valve 150 and the lubricating chamber 75. The pressure control valve 50 is openable at a pressure level lower than the pressure level set for opening the relief valve 150. In operation, excess oil from the replenishing oil passage 137 is supplied through the relief valve 150 to the lubricating chamber 75. Therefore, even if the amount of oil leaked from between the sliding surfaces of the motor shoe 66 and the motor swash plate 63 into the lubricating chamber 75 is small, the lubricating chamber 75 can be filled with lubricating oil from the relief valve 150. When the oil pressure in the lubricating chamber 75 is increased beyond a prescribed pressure level, the pressure control valve 50 is opened to release oil from the lubricating chamber 75 for keeping the oil pressure in the lubricating chamber 75 at a lever lower than the oil pressure in the replenishing oil passage 137.

Although certain preferred embodiments have been shown and described, it should be understood that many changes and modifications may be made therein without departing from the scope of the appended claims.

What is claimed is:

1. A hydraulically operated continuously variable transmission comprising:
 an output shaft;
 a hydraulic motor coupled to said output shaft and having a motor swash plate and a motor cylinder supporting an annular array of slidable motor plungers held in slidable contact with said motor swash plate;
 a distribution member integral with said motor cylinder;
 an input shaft;
 a hydraulic pump coupled to said input shaft in sliding contact with said distribution member and having a pump swash plate movable with said motor cylinder and a pump cylinder supporting an annular array of slidable pump plungers held in slidable contact with said pump swash plate;
 a closed hydraulic circuit inteconnecting said hydraulic pump and said hydraulic motor;
 said pump cylinder being coaxially surrounded by said motor cylinder with a hydraulically hermetic chamber defined therebetween;
 a replenishing pump operatively coupled to said input shaft and connected to said closed hydraulic circuit through a replenishing oil passage, said replenishing oil passage partly extending in said distribution member;
 said distribution member having an oil passage defined therein and interconnecting said replenishing oil passage and said hydraulically hermetic chamber; and a relief valve disposed in said oil passage in said distribution member, said relief valve being openable when the pressure of oil in said replenishing oil passage exceeds a prescribed level.

2. A hydraulically operated continuously variable transmission according to claim 1, wherein said relief valve comprises a valve chamber defined in said distribution member and a spring-biased spool valve body housed in said valve chamber.

3. A hydraulically operated continuously variable transmission according to claim 1, wherein said relief valve comprises a valve chamber defined in said distribution member and a spring-biased spherical valve body housed in said valve chamber.

4. A hydraulically operated continuously variable transmission comprising:

an output shaft;

a hydraulic motor coupled to said output shaft and having a motor swash plate and a motor cylinder supporting an annular array of slidable motor plungers held in slidable contact with said motor swash plate;

a distribution member integral with said motor cylinder;

an input shaft;

a hydraulic pump coupled to said input shaft in sliding contact with said distribution member and having a pump swash plate movable with said motor cylinder and a pump cylinder supporting an annular array of slidable pump plungers held in slidable contact with said pump swash plate;

a closed hydraulic circuit interconnecting said hydraulic pump and said hydraulic motor;

said pump cylinder being coaxially surrounded by said motor cylinder with a hydraulically hermetic chamber defined therebetween;

a replenishing pump operatively coupled to said input shaft and connected to said closed hydraulic circuit through a replenishing oil passage, said replenishing oil passage partly extending in said distribution member;

said distribution member having an oil passage defined therein and interconnecting said replenishing oil passage and said hydraulically hermetic chamber; and a relief valve disposed in said oil passage in said distribution member, said relief valve being openable when the pressure of oil in said replenishing oil passage exceeds a prescribed level;

wherein said motor cylinder has discharge holes for discharging oil from said hydraulically hermetic chamber toward said motor swash plate and said motor plungers.

5. An oil flow apparatus in a hydraulically operated continuously variable transmission of the kind having a swash plate type pump and a swash plate type motor, a pump cylinder, a motor cylinder, a pump swash plate, a motor swash plate, a closed hydraulic circuit connecting said pump and motor, a distribution member communicating with said pump and motor, and a replenishing pump connected to said closed hydraulic circuit through a replenishing oil passage, said replenishing oil passage partly extending in said distribution member, comprising;

a hydraulically hermetic chamber surrounding said pump swash plate;

a second oil passage in said distribution member, said second oil passage communication between said replenishing oil passage and said hydraulically hermetic chamber; and a relief valve disposed in said second oil passage in said distribution member for selectively permitting the flow of oil between said replenishing oil passage and said hydraulically hermetic chamber, said flow of oil being permitted when the pressure of oil in said replenishing oil passage exceeds a prescribed level.

6. An oil flow apparatus according to claim 5, wherein said pump cylinder is coaxially surrounded by said motor cylinder and said motor cylinder has discharge holes for discharging oil from said hydraulically hermetic chamber toward said motor swash plate.

7. An oil flow apparatus according to claim 5, wherein said relief valve comprises a valve chamber defined in said distribution member and a spring-biased spool valve body housed in said valve chamber.

8. An oil flow apparatus according to claim 5, wherein said relief valve comprises a valve chamber defined in said distribution member and a spring-biased spherical valve body housed in said valve chamber.

9. An oil flow apparatus in a hydraulically operated continuously variable transmission of the kind having a swash plate type pump and a swash plate type motor, a pump cylinder, a motor cylinder, a pump swash plate, a motor swash plate, a closed hydraulic circuit connecting said pump and motor, a distribution member communicating with said pump and motor, and a replenishing pump connected to said closed hydraulic circuit through a replenishing oil passage, said replenishing oil passage partly extending in said distribution member, comprising;

a hydraulically hermetic chamber surrounding said pump swash plate;

a second oil passage in said distribution member, said second oil passage communicating between said replenishing oil passage and said hydraulically hermetic chamber;

a relief valve disposed in said second oil passage in said distribution member for selectively permitting the flow of oil between said replenishing oil passage and said hydraulically hermetic chamber, said flow of oil being permitting when the pressure of oil in said replenishing oil passage exceeds a prescribed level; and a second relief valve communicating with said hydraulically hermetic chamber for permitting oil to flow from said hydraulically hermetic chamber to an oil reservoir when the oil pressure in said hydraulically hermetic chamber exceeds a second oil pressure, said second oil pressure being less than said prescribed level.

* * * * *